United States Patent
Willman et al.

(10) Patent No.: US 10,478,733 B2
(45) Date of Patent: *Nov. 19, 2019

(54) COMPUTER SYSTEM AND METHOD FOR CREATING, DISPLAYING, REMOVING, AND REPOSITIONING GAME ELEMENTS

(71) Applicant: KING.COM LIMITED, St. Julians (MT)

(72) Inventors: Eddie Alexander Willman, Stockholm (SE); Yan Dou, Stockholm (SE); Karl David Darabian, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,693

(22) Filed: Feb. 26, 2018

(65) Prior Publication Data

US 2018/0178131 A1 Jun. 28, 2018

Related U.S. Application Data

(63) Continuation of application No. 14/838,785, filed on Aug. 28, 2015, now Pat. No. 9,901,834.

(51) Int. Cl.
*A63F 13/00* (2014.01)
*A63F 13/80* (2014.01)
(Continued)

(52) U.S. Cl.
CPC ............. *A63F 13/80* (2014.09); *A63F 13/42* (2014.09); *A63F 13/52* (2014.09); *A63F 13/56* (2014.09)

(58) Field of Classification Search
CPC .... A63F 13/2145; A63F 13/822; A63F 13/30; A63F 13/92; A63F 13/537; A63F 13/46;
(Continued)

(56) References Cited

U.S. PATENT DOCUMENTS

2013/0331162 A1* 12/2013 Krivicich ............ G06F 3/04812
463/10
2014/0080561 A1* 3/2014 Knutsson ................ A63F 13/12
463/10
(Continued)

OTHER PUBLICATIONS

Candy Crush Saga, Jul. 31, 2014, candycrush.wikia.com,<http://candycrush.wikia.com/wiki/Regular_Icing?oldid=222461>,<http://candycrush.wikia.com/wiki/Candy_Crush_Saga?oldid=205315>.*
(Continued)

*Primary Examiner* — Justin L Myhr
(74) *Attorney, Agent, or Firm* — Saul Ewing Arnstein & Lehr LLP

(57) ABSTRACT

A computer device has a touch screen which displays game elements. A user is able to move game elements to make a match. When a match is made, the game elements of the match are removed. Each game element is associated with a tile. Each tile either has a cover object or no cover object. Underlying entities are provided which occupy at least two tiles. The device has a processor which is configured to determine on detecting the match game condition if at least one tile of the game elements in the match game condition has a cover object and if so to remove the cover object and subsequently to determine if the underlying entities are only associated with tiles having cover tiles. If not, the underlying entity is repositioned if partially uncovered or removed if completely uncovered.

18 Claims, 17 Drawing Sheets

(51) Int. Cl.
*A63F 13/56* (2014.01)
*A63F 13/42* (2014.01)
*A63F 13/52* (2014.01)

(58) Field of Classification Search
CPC ...... A63F 13/005; A63F 13/335; A63F 13/80;
A63F 13/426; A63F 13/20; A63F 13/42;
A63F 13/55; A63F 13/69; A63F 2300/61;
A63F 2003/0418
See application file for complete search history.

(56) References Cited

U.S. PATENT DOCUMENTS

| | | | |
|---|---|---|---|
| 2014/0235306 A1* | 8/2014 | Walls ...................... | A63F 13/10 463/9 |
| 2014/0302935 A1* | 10/2014 | Royce .................... | A63F 13/822 463/42 |
| 2014/0342791 A1* | 11/2014 | Hugh ...................... | A63F 13/80 463/9 |

OTHER PUBLICATIONS

"Cake Bomb", Jul. 15, 2014, Candy Crush Saga Wiki, <https://candycrush.fandom.com/wiki/Cake_Bomb?oldid=206566> (Year: 2014).*

* cited by examiner

COMPUTER SYSTEM AND METHOD FOR CREATING, DISPLAYING, REMOVING, AND REPOSITIONING GAME ELEMENTS

CROSS-REFERENCE TO RELATED APPLICATIONS

This is a continuation of U.S. application Ser. No. 14/838,785, filed on Aug. 28, 2015, the entire contents of which being fully incorporated herein by reference.

FIELD OF THE INVENTION

The present invention relates to controlling a user interface responsive to user engagement with displayed elements on the interface of a computer device. The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear. An existing type of match-three game is a so-called "switcher" game. In a switcher game, the player switches place onto adjacent game elements on the game board so that one or both of them create a chain of at least three adjacent game elements of the same type. Those matched game elements will then disappear. The game board is then repopulated with game objects.

One such known match three-type game is known by the trade name Candy Crush. In that game, the game board is repopulated with game elements which are perceived as falling downwards onto the game board from the top edge of the screen from which the game is played.

Another known type of game is "linker game", where a sequence of game elements are linked to form a known sequence. Another type of game is a 'clicker' game, in which matches can be made in a board by clicking adjacent game elements.

A technical challenge exists when introducing complexity into such match games.

The user when playing a game may play a match against the computer. A technical challenge is presented in creating the computer implemented software or AI (artificial intelligence) which provides moves in response to those of the user.

SUMMARY OF THE INVENTION

Aspects may provide improved methods of controlling a user interface in the context of a computer-implemented game of a matching type (switcher, clicker or linker). Some aspects may provide a solution to the technical problem of improved user engagement by providing a new user engagement mode, which is implemented by a processor and data structure in a computer device.

According to one embodiment, there is provided a computer device having: a user interface configured to display user actuatable game elements in a game board and to detect user input when a user engages with a game element in a move; at least one processor configured to receive a detected user input and on detecting a match game condition associated with the game elements to control the user interface to remove at least three game elements from the display and to generate replacement user game elements for a subsequent move; and a graphics rendering component operable to render the game elements on the user interface, each game element having a graphical representation on a tile having one of a plurality of different properties, at least one object being associated with a plurality of tiles having a first one of the plurality of properties, wherein the processor is configured to determine on detecting the match game condition if at least one tile of the game elements in the match game condition has a first one of the plurality of properties and if so to change the property to a second one of the properties and subsequently to determine if the at least one object is only associated with tiles having the first property, the processor further being configured to determine for the or each of the at least one objects associated with at least one tile having the first property and at least one tile of having the second property, if that object can be positioned so that the respective object is only associated with a plurality of tiles having the first property and if so to reposition the respective object.

The user interface may be provided by a touch screen on which the game elements are displayed.

The graphics rendering component may be operable to render a representation of the repositioned respective object.

The first property may comprise the presence of a first property object and the second property comprises the absence of the first property object.

The first property object may comprise a cover object and the second property comprise the absence of the cover object.

The at least one object may be configured to underlie at least one of the cover objects.

The processor may be configured to determine if the respective object can be positioned so that the respective object is only associated with a plurality of tiles having the first property by determining a plurality of candidate areas, each candidate area comprising a plurality of tiles having the first property The processor may be configured to consider the candidate areas in turn until a candidate area is found where the respective object can be positioned so that the respective object is only associated with a plurality of tiles having the first property.

For at least one candidate area, the processor may be configured to determine if one or more entities of the respective object are present in the candidate area.

For at least one candidate area, the processor may be configured to determine if one or more entities of another object are present in the candidate area and if so to adjust the candidate area.

The processor may be configured to remove any candidate area from the candidate areas which is smaller than the respective object.

The processor may be configured to determine a path of movement for the respective object from its current position to the reposition.

The processor may be configured to select a first tile position and a second tile position and to determine said path of movement for the respective object between said first and second tile positions.

The graphics rendering component may be configured to cause the game element to be overlaid over the first property object which is overlaid over an entity of the object.

The processor may be configured to determine if at least one object is only associated with tiles having the second property and if so to remove the object.

The graphics rendering component may operable to render game elements in multiple varieties, each variety differing from another variety in its shape and/or colour of the game element rendered on each tile.

The game elements may resemble candies.

The computer device may comprise an artificial intelligence configured to play against said user, said artificial intelligence configured to cause a match of said game elements and in response to said match, a tile at the position of a matched game element is configured to have said first property.

At least one processor may implement an AI player logic.

Thus, in one embodiment a first player attempts to change the tiles to have the second property and a second player or AI attempts to change the tiles to have the first property.

According to another embodiment, there is provided a computer device which has a touch screen which displays game elements. A user is able to move game elements to make a match. When a match is made, the game elements of the match are removed. Each game element is associated with a tile. Each tile either has a cover object or no cover object. Underlying entities are provided which occupy at least two tiles. The device has a processor which is configured to determine on detecting the match game condition if at least one tile of the game elements in the match game condition has a cover object and if so to remove the cover object and subsequently to determine if the underlying entities are only associated with tiles having cover tiles. If not, the underlying entity is repositioned if partially uncovered or removed if completely uncovered.

According to another embodiment, there is provided a computer program product for controlling the display of a tile image on a display of a computer device, the computer program product comprising code embodied on a computer-readable medium and being configured so as when executed on a processor of the computer to: cause user actuatable game elements in a game board to be displayed; detect user input when a user engages with a game element in a move; on detecting a match game condition associated with the game elements, cause at least three game elements from the displayed game board and generate replacement user game elements for a subsequent move; render the game elements on the user interface, each game element having a graphical representation on a tile having one of a plurality of different properties, at least one object being associated with a plurality of tiles having a first one of the plurality of properties; determine on detecting the match game condition if at least one tile of the game elements in the match game condition has a first one of the plurality of properties and if so to change the property to a second one of the properties and subsequently to determine if the at least one object is only associated with tiles having the first property; and determine for the or each of the at least one objects associated with at least one tile having the first property and at least one tile of having the second property, if that object can be positioned so that the respective object is only associated with a plurality of tiles having the first property and if so to reposition the respective object.

According to another embodiment, there is provided a computer implemented method of controlling a user interface responsive to user engagement with displayed game elements on an interface, the method comprising the following steps implemented by a processor of a computer device: causing user actuatable game elements in a game board to be displayed; detecting user input when a user engages with a game element in a move; on detecting a match game condition associated with the game elements, causing at least three game elements from the displayed game board and generate replacement user game elements for a subsequent move; rendering the game elements on the user interface, each game element having a graphical representation on a tile having a one of a plurality of different properties, at least one object being associated with a plurality of tiles having a first one of the plurality of properties; determining on detecting the match game condition if at least one tile of the game elements in the match game condition has a first one of the plurality of properties and if so to change the property to a second one of the properties and subsequently determining if the at least one object is only associated with tiles having the first property; and determining for the or each of the at least one objects associated with at least one tile having the first property and at least one tile of having the second property, if that object can be positioned so that the respective object is only associated with a plurality of tiles having the first property and if so to reposition the respective object.

A further aspect provides computer program products for implementing the afore-defined methods.

BRIEF DESCRIPTION OF THE DRAWINGS

For a better understanding of the present invention and to show how the same may be carried into effect, reference will now be made by way of example to the accompanying drawings in which.

Embodiments of the invention will now be described by way of the accompanying drawings in which.

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement the way in a number of variations without departing from the spirit or scope of the invention.

Figure 14:
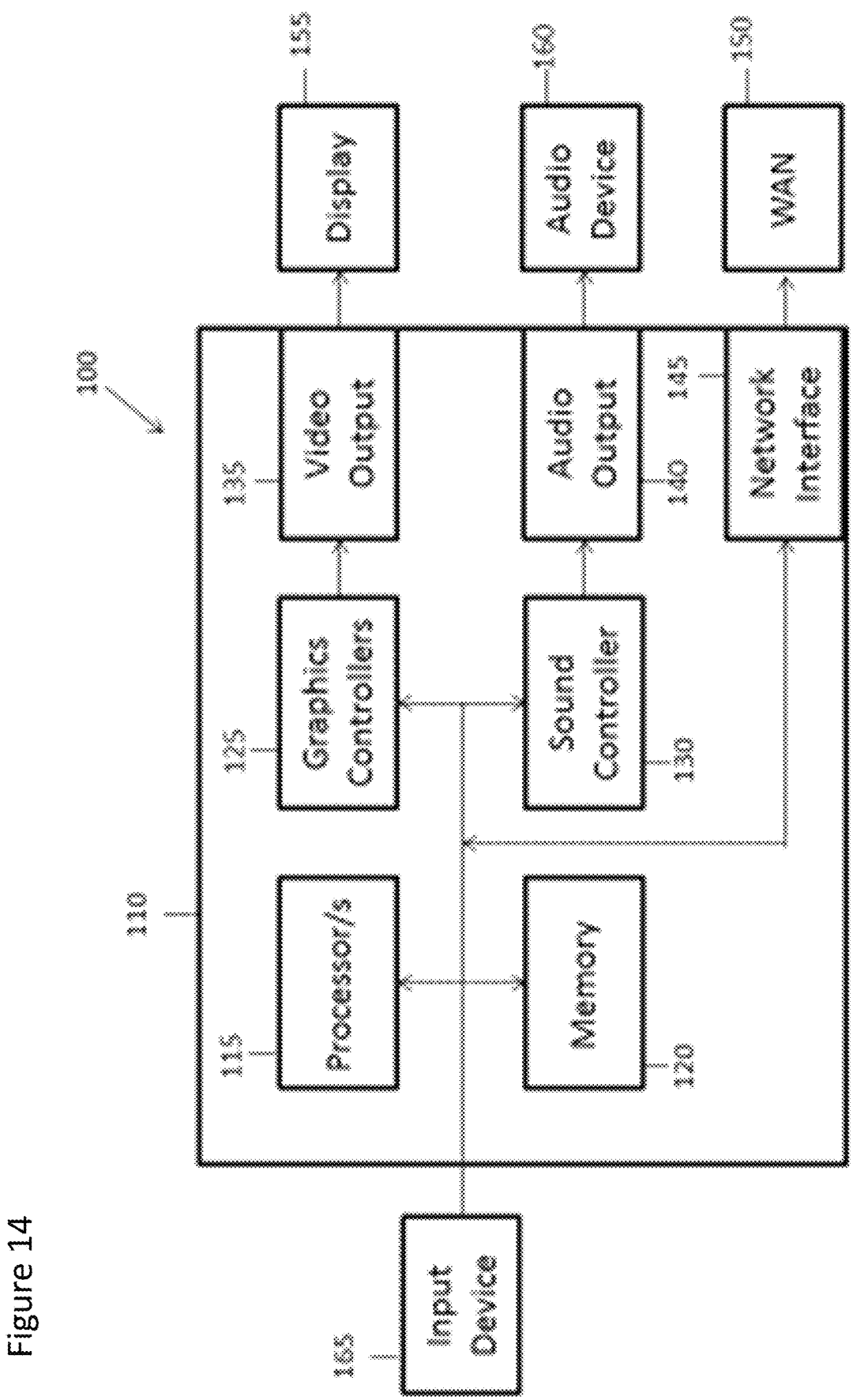
FIG. 14 shows an example user device in which some embodiments may be provided.

A schematic view of a user device 100 according to an embodiment is shown in FIG. 14. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 13:
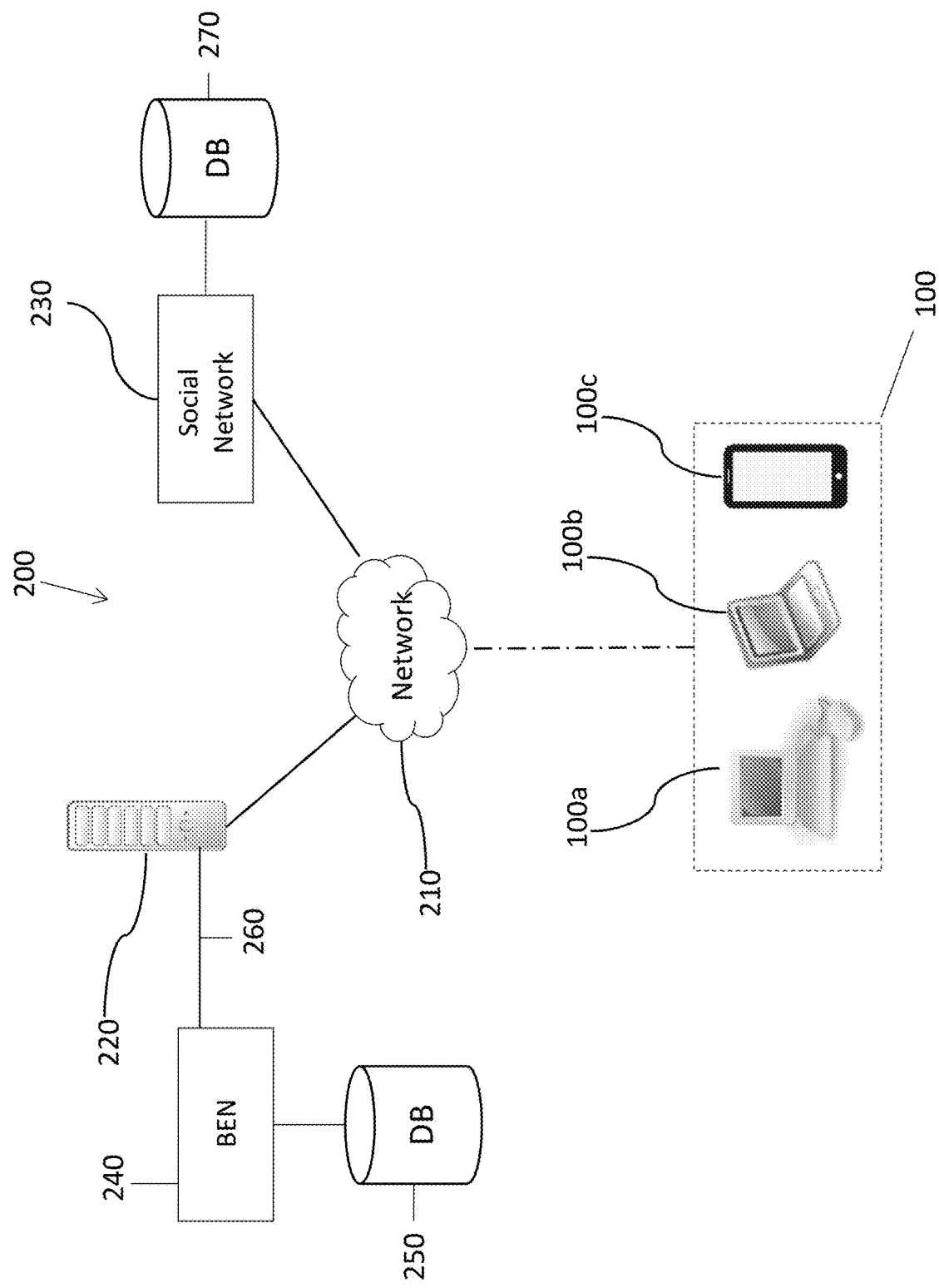
FIG. 13 shows an example system in which some embodiments may be provided.

FIG. 13 schematically shows a system 200 according to an embodiment. The system 200 comprises a server 220 which may store or be in communication with database 250 which may be, in some embodiments, be connected to a back end infrastructure (BEN) of game player's details, profiles, statistics etc. In practice, one or more databases 250 may be provided. Where more than one server 220 is provided, the database(s) 250 may be provided in one database 250 or across two or more servers. The server 220 may also have a games data function. This may comprise one or more units of memory to store the computer game program, user behaviour data and a processor 115 to run the games program and process the user behaviour data.

The server 220 may communicate via, for instance, the internet 210 to one or more client or user devices 100, shown in FIG. 13 by way of example as user devices 100a, 100b and 100c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 320 may handle some elements of the game in some embodiments. By way of example only, a Java game applet may be provided to the user device 200 and the locally running Java applet will generate, for example, the graphics, sounds, and user interaction for the game play on the user device. Some data may be fed back to the server to allow interaction with other players 305. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 1:
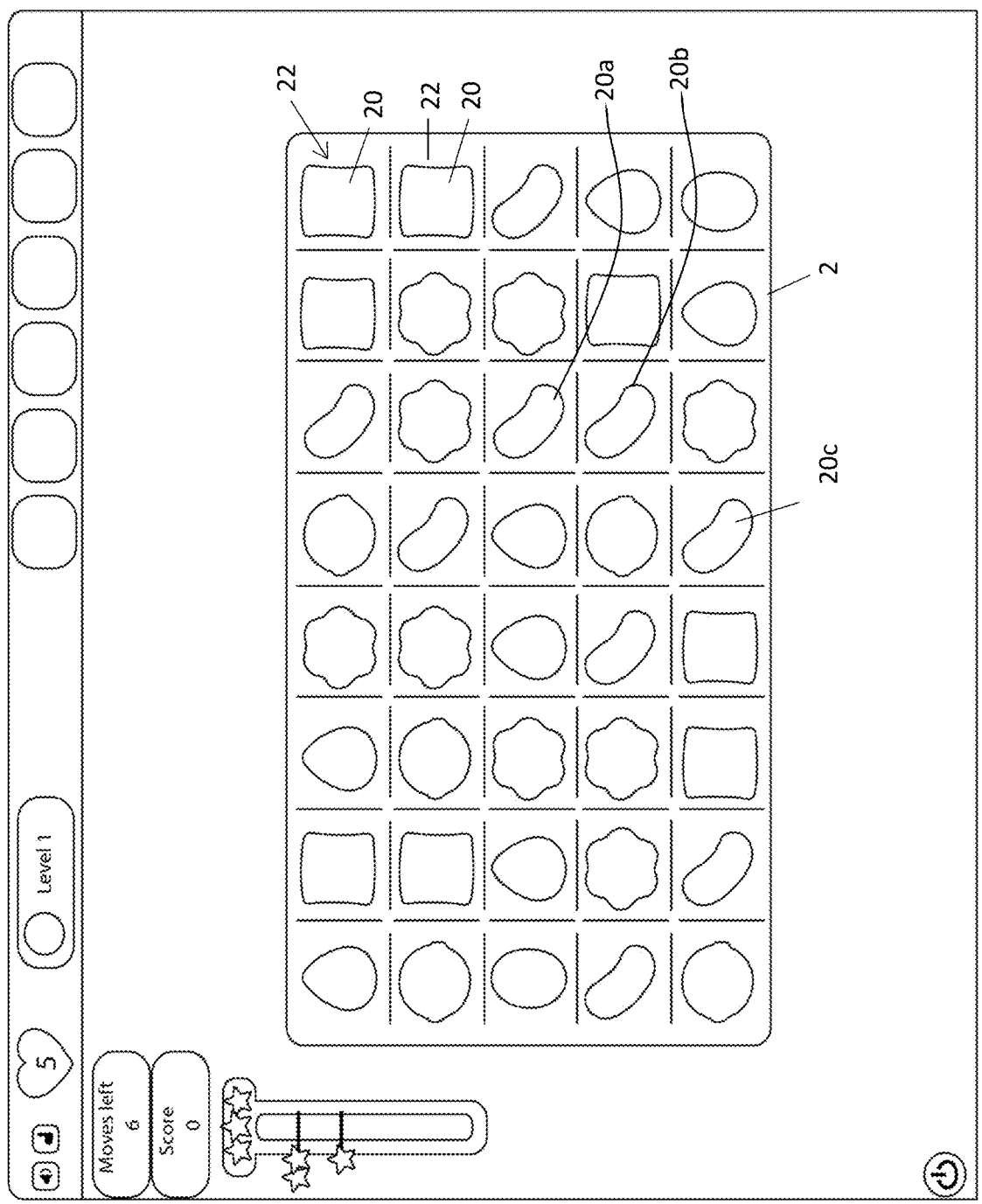
FIG. 1 is a schematic diagram of a game board of a match three game illustrating a basic example of a match three game.

FIG. 1 shows a display of a known version of a match 3 switcher game called Candy Crush Saga™. FIG. 1 illustrates a game board 2 with a plurality of game elements 20. The game elements are each of six different shapes and colours. Each game element is supported by the 22.

Figure 2:
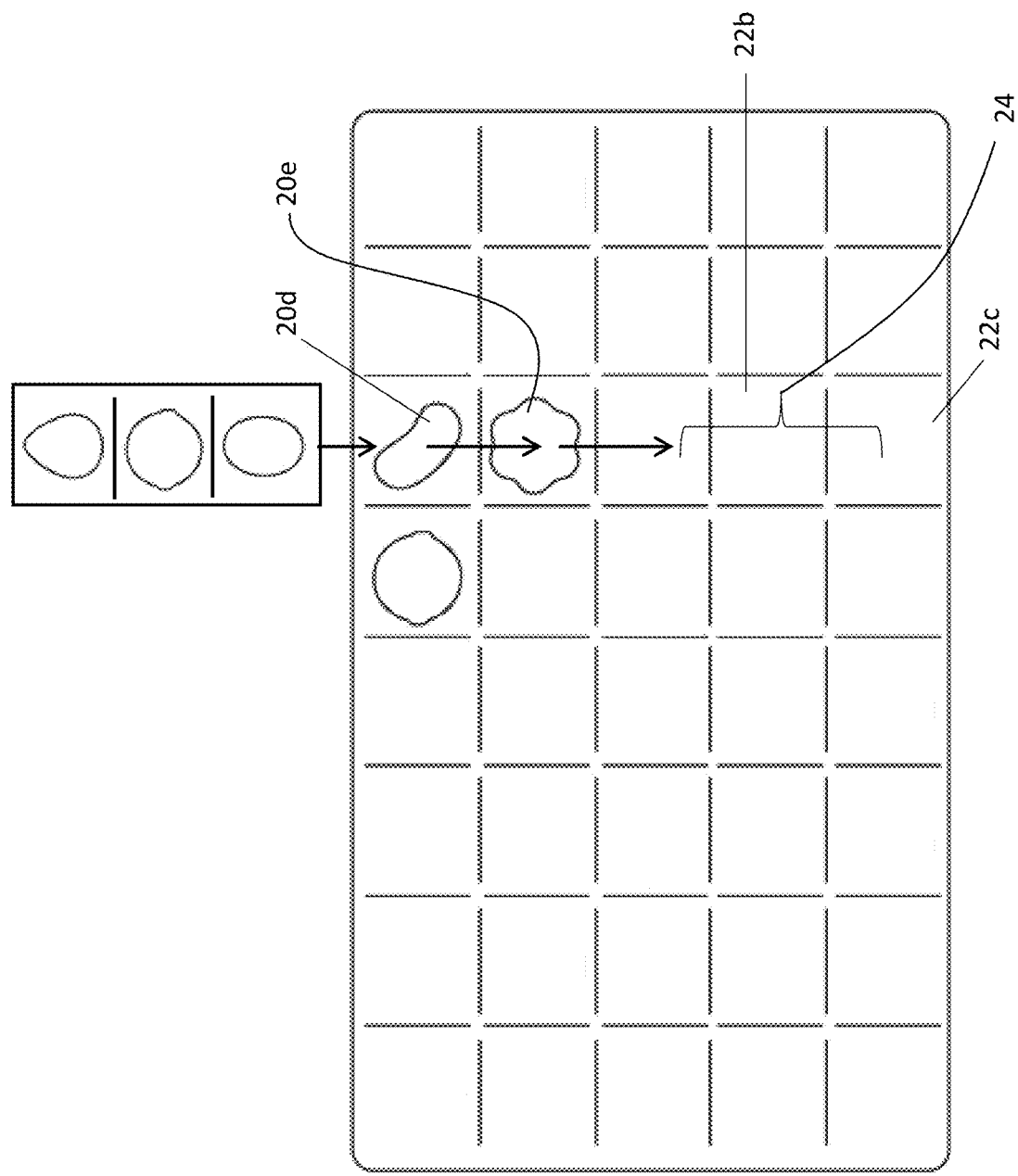
FIG. 2 is a schematic diagram illustrating how a game board is repopulated with replacement game elements.

In the known version of the match 3 switcher game, the aim of the game is to swop game elements in the shape of candies with each other to make moves on the game board. To gain points the player has to make moves that create matches of at least three of the same game element or candy. In doing so, the player gains points and the matched game elements are removed. As a result new game elements fall into place from the top of the game board in order to fill any spaces created. Assume in FIG. 1 that game element 20c is moved one place to the right to form a three-line match with game elements 20a and 20b. Turning now to FIG. 2, this has the effect of game elements 20a, 20b and 20c being removed or "disappearing" from the game board, creating a visual effect (animation) on the screen to indicate the disappearance, such as a minimal explosion effect. The two game elements which were directly above game elements 20a will now fall downwards into the spaces created by the removal of game elements 20a, 20b and 20c. Thus, game element 20e will end up at the location 22c, and game element 20d will end up at the location 22b. In addition, three new game elements are provided and fall downwards into the game board to fill the remaining three spaces above location 22b. The new game elements may be generated at random. The user then has a new game board on which to play a subsequent move.

The so-called physics of the game elements on generation of a new game board after each move is the same in the existing version of the game called Candy Crush. That is, game elements drop down from above the game board at a set speeds and from the top of the game board. In an alternative version detailed in U.S. Ser. No. 14/316,274 and launched under the name Candy Crush Soda, the physics can vary so that the speed and direction of replacement game elements can alter.

In the following, a game board is made up of game positions or tiles each of which is covered by a game element, each will have a first or second background and some of which will have an underlying object.

Each of the game positions will have either a background of a first type or have a background of a second type. In the example discussed, the first background type can be provided by the presence of a cover object and the second background type can be regarded as being the absence of the cover object. In the example embodiment, the first background type can be regarded as a cover object which can be removed to provide the absence of the cover object, as the second background type. By way of example only, the appearance of the cover object may be of frosting. The background is associated with the game position and not with the game element, in some embodiments. In other words, if the game element moves, due to a match being made elsewhere on the board, the background does not move with the game element—the background is static.

In other embodiments, the first background type may be provided by an opaque object and the second background type can be provided by a clear object.

In other embodiments, the first and second background types may have different colours.

In some embodiments an underlying object is provided. The underlying object is sized such that it will occupy at least two adjacent game positions. In some embodiments, an underlying object can be considered to be made up of a plurality of connected entities where each entity occupies one game position. The underlying object is capable of moving, if required. In some embodiments, the underlying object is initially provided beneath the cover objects and the aim is to remove the underlying object from the game board by removing all the cover objects which lie over the underlying object. In some embodiments, the underlying object is able to move in certain circumstances. In some embodiments the underlying object is made up of a chain of entities.

It will be understood that each tile has a game board position, but game elements are removed and replaced over the tiles. The background appearance is the appearance of a static tile underlying the game element or a game object which may change. A background appearance may cover the whole tile or only a part thereof.

It should be appreciated that there is a technical challenge is controlling the three layers of objects on the game board, where each layer has different rules and an action in one layer has an influence on the action on another layer.

Reference is now made to FIGS. 3, 4 and 6 to 9 which shows a first game mode where a user has a goal to capture all underlying objects.

In one embodiment, the game board is initially configured so that the underlying objects are each covered completely by the cover objects. If one or more, but not all, cover objects covering an underlying object is/are removed, the underlying object may attempt to move to a new position. The new position should be such that the underlying object is completely covered by cover objects, it is not occupied by another underlying object or entity thereof, and the cover objects are adjacent cover objects which currently overly a part of the underlying entity. If a position is found, the underlying object will move to that position. This may require more than one entity of the underlying object to move so that all of the underlying object is covered. If a position cannot be found, the underlying object does not move. If all the cover objects covering an underlying object are removed, the underlying object is captured.

Figure 3:
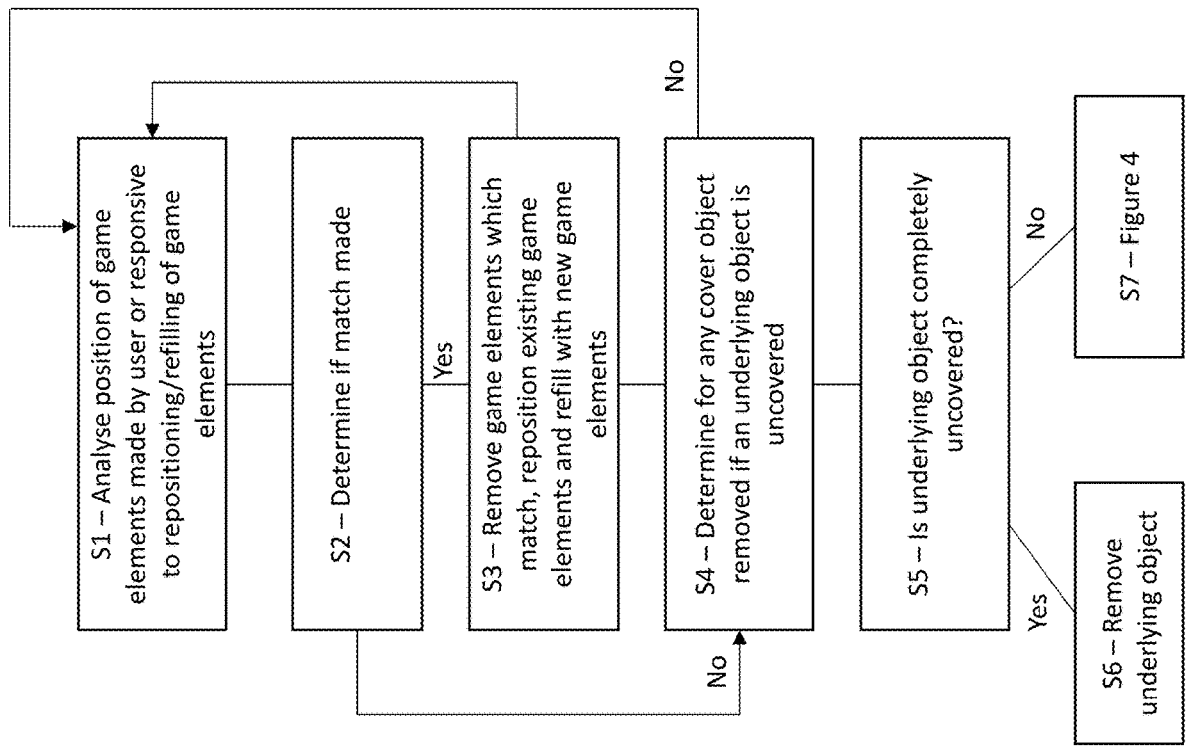
FIG. 3 is a first flow chart showing steps performed by a user device after a change is made to game object to determine if an underlying object is uncovered.

Reference is made to FIG. 3 which shows a first part of a method according to an embodiment.

In step S1, the position of game elements are analysed. This may be responsive to the user interacting with the game board via the user interface or may be responsive to the repositioning/refilling of game elements following a match. For example, the user may interact with the user interface to swop the position of two game elements.

In step S2, any game elements which form a match are determined. If no matches are detected, then the next step is step S4. It should be appreciated that this may be determined in any suitable manner. By way of example only, game rules may be applied to determine if there is a match. The game rules may be applied by a game engine or processor.

On the other hand, if one or more matches are detected, then the next step is step S3. The game elements which match are removed. It should be appreciated that any cover object which underlies a removed game element is itself removed. The existing game elements are repositioned and the game board is refilled with new game elements. It should be appreciated that the cover objects will not be repositioned along with the game elements and instead will stay in their current position.

Step S3 will be followed by step S1. In other words, steps S1 to S3 are repeated until the game board is static and no more matches are made, in a particular turn.

In step S4, it is determined for any cover object which has been removed if an underlying object is uncovered. If not, then the method reverts back to step S1.

On the other hand, if it is determined that a cover object which has been removed exposes an underlying object, then it is determined in step S5 whether the underlying object is completely uncovered. As discussed previously, the underlying object will occupy at least two game tiles or positions.

If it is determined that the underlying object is completely uncovered, the next step is step S6 where the underlying object is removed from the game board.

Figure 4:
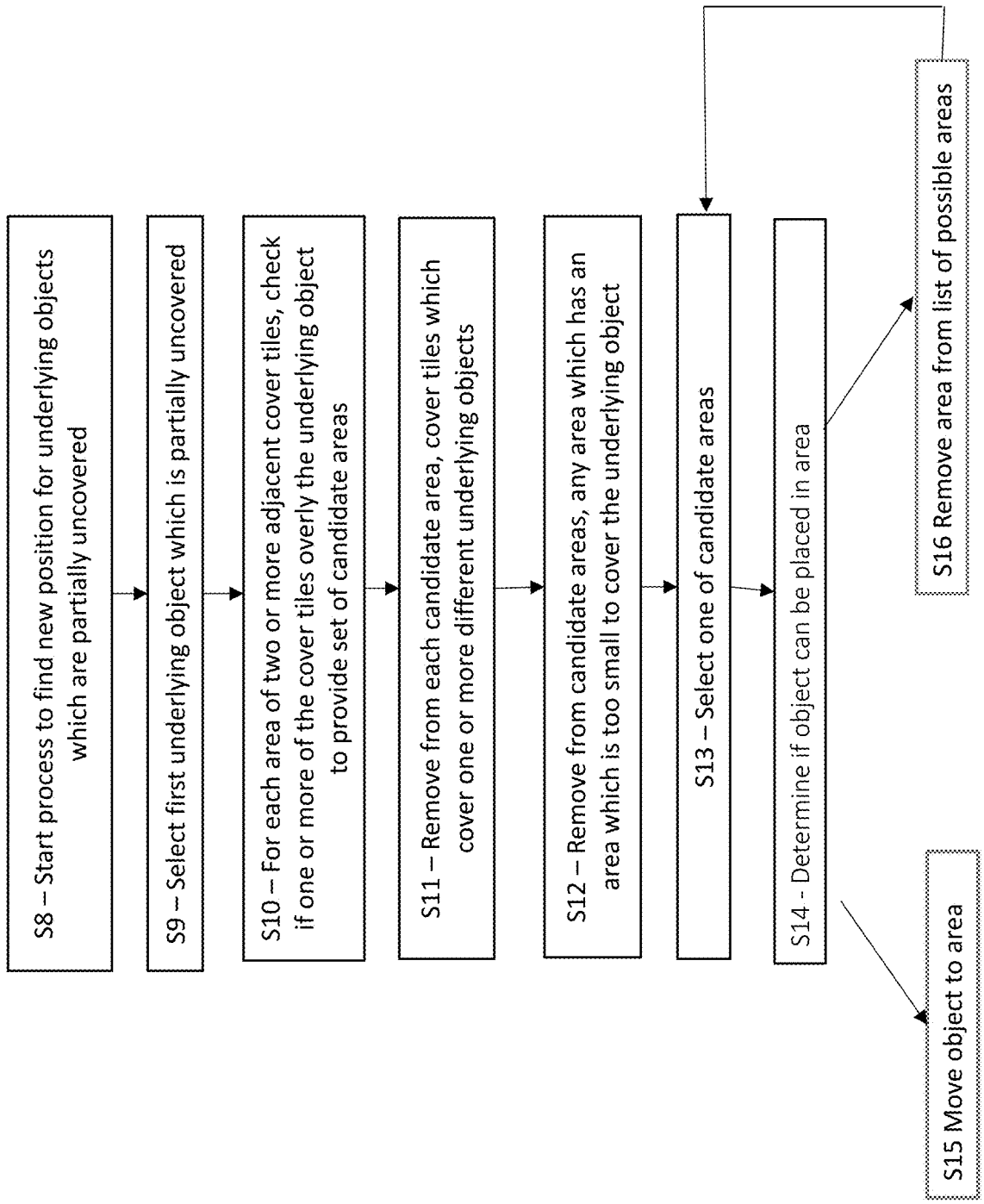
FIG. 4 is a second flow chart showing steps performed by a user device if it is determined that an underlying object is partially uncovered.
Figure 5:
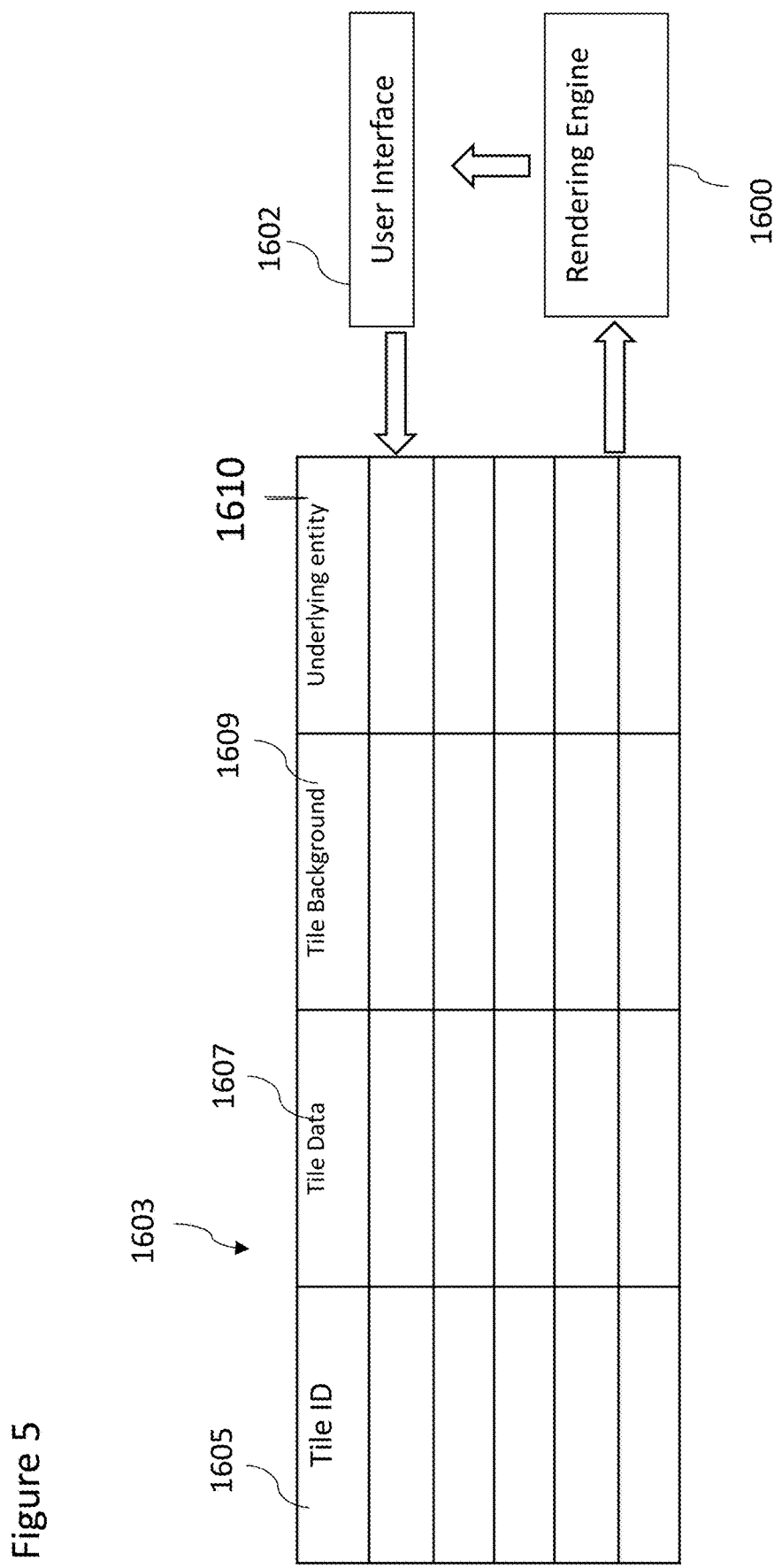
FIG. 5 schematically shows a data structure for managing tile data, showing the interrelation between the data structure and a rendering engine of a graphics controller.

If it is determined that the underlying object has not been completely uncovered, then the next step is step S7 which causes the method steps shown in FIG. 4 to be performed.

The steps shown in FIG. 3 may be carried out in the order shown or in any other order. In some embodiments, at least one step may be performed in parallel. For example each time a cover object is removed, it is determined in that cover object had an entity of the underlying object under it and if the underlying object is partially or completely uncovered. This may be done in parallel any one of steps S1 to S3 which may be performed for repositioned game elements and/or refill game elements.

In one modification, when it is determined that a match has been made, it is determined if an entity of said underlying object is uncovered and if so whether the underlying object is completely uncovered. If so the underlying object is removed. This means that underlying objects which are completely uncovered may be removed before the game board has stabilised. The game board is stabilized when no further matches, due to for example repositioning and refilling, are possible. This may be done during step S2 and/or during step S3. In this modification, steps S5 and S6 may not be necessary.

In one modification, in step S4, instead of determining for any cover object removed if any underlying object is uncovered, the method may comprise checking each underlying object to see if any entity thereof is uncovered in response to a match or the like.

Reference is now made to FIG. 4 which shows method steps which are carried out for each underlying object which has been determined to be partly, but not completely uncovered. Thus the method of FIG. 4 is generally performed after the game board has stabilized, i.e. no game elements are moving and nothing is about to modify the board. Step S8 starts to the process to find a new position, if possible, for underlying objects which are partly, but not completely uncovered.

In step S9, a first one of the underlying objects which is partially uncovered is selected. It should be appreciated that is some embodiments, there may only be one underlying object. As such, this step may be omitted.

In step S10, for each area of two or more adjacent cover tiles, a check is mode to see if one or more cover tiles of the area overlie one or more entities of the underlying object. In some embodiments, there may only be one other underlying objects. In other embodiments there may be two or more other underlying objects. Any area of adjacent cover tiles which overlies at least one entity of the underlying object is considered to be a candidate area. All of the candidate areas will be identified to provide a set of candidate areas. In some embodiments, instead of identifying all the candidate areas, up to n candidate areas are identified where n is an integer.

In step S11, for each candidate area, the cover tiles which cover entities of different underlying objects are removed from consideration.

In step S12, the candidate areas which do not have enough cover tiles to cover the underlying object, after removing the cover tiles overlying different underlying objects, are removed from the set of candidate areas.

In step S13, one of the remaining candidate areas is selected.

In step S14, it is determined if the underlying object can be placed in the area. If it can, then the next step is step S15 where the object is moved to underlie the candidate area. If not then, the next step is step S16 where the selected candidate area is moved from the list of possible areas and the method reverts back to step S13 where the next candidate area is selected.

The candidate areas may be searched in a random order for a new position of the underlying entity. The candidate areas may be searched in random order, selecting a cover object position contained in the candidate area and adding it to a list containing the tile positions making up the potential new positions for the underlying object. The cover object position initially selected may be adjacent the current position of the uncovered entity or may be elsewhere in the candidate area. A random tile of the candidate area neighbouring the tile last added to the list is added to the list. This is repeated until the list contains enough tiles to cover the whole underlying object. A new valid position has been found for the underlying object and the search is ended. If the list does not contain enough tiles, the search continues to the next candidate area.

It should be appreciated that the method will revert back to step S9 to repeat the process for the next underlying object which is partially uncovered, in the case that there is another underlying object to be considered.

In other embodiments, a first candidate area is selected and then a determination is made as to whether the underlying object can move so as to be completely under the first candidate area. If so, then underlying object is moved. If not, a next area is checked to see if it is a candidate area and so on.

In one embodiment, a new position for each underlying object may be determined in turn, as will be discussed above. However, it should be appreciated that in some embodiments, a more complex method may be performed particularly to deal with contention for cover objects by two different underlying objects. This would involve determining for each partially covered underlying object all candidate areas and then selecting candidate areas where there are no contention with other underlying objects in preference to those with contention. Where there is contention of a candidate area between two underlying objects, any suitable method may be used to select which one of the underlying objects is assigned the candidate area. For examples one of more factors such as size of underlying object, proximity to other candidate areas, and number of entities of the underlying object exposed may be taken into account.

The order in which the steps shown in FIG. 4 may differ from that shown. In some embodiments, one or more steps may be left out. In some embodiments, one or more additional steps may be performed. In one embodiment, the steps S11 and S12 may be carried out as part of step S14.

In some embodiments, it is not possible for an underlying object to completely underlie a single candidate area. Accordingly, in that case the number of entities of the underlying object which are exposed are determined. If possible a candidate area which allows for only one entity to be exposed may be selected.

Where there is no candidate area which is able to accommodate all of an underlying entity and there is more than one exposed entity of the underlying object, a search may be made to see if there are two candidate areas in combination which are able to cover all but one entity of the underlying object.

In some embodiments, the algorithm may be more complex and is able to control the position of at least one other underlying object such that the current underlying object can be covered. For example, if another underlying object is lying across the middle of a covered area such that the candidate area is too small for the current underlying object being considered, the other underlying object may be moved to increase the size of the candidate area available for the current underlying object being considered.

In some embodiments, the movement sequence of the underlying object may be selected so that the rendered view will appear that the underlying object is moving. For example a movement sequence for each entity of the underlying object for which a new position was found may be determined.

A "contraction" tile or position is selected for the underlying object by picking the tile of the entity of the underlying object in the middle of the underlying object, or if there an even number of entities in the underlying object, the tile of one of the entities on either side of the underlying object center. In some embodiments, the underlying object will occupy a single tile, the contraction tile.

An "expansion" tile is selected for the underlying object. Any suitable tile may be selected. For example, the tile in the middle of the new position list of tiles may be selected, or if it contains an even number of tiles, the tile before or after the center. The expansion tile in some embodiments may be the tile which, after the underlying object has moved will accommodate an entity which is at one end of the underlying object which is in the form of a chain.

The contraction and expansion tile may both be under the cover objects in some embodiments.

A movement path underneath the cover tiles is found between the contraction tile and the expansion tile using any suitable algorithm, for example the A* or A-star algorithm.

Each entity of the underlying object starts moving towards its new position, over several frames. In some embodiments, the entities occupy a single tile during the movement. For example the entities in the underlying object moves along the underlying object to the contraction tile. Once all entities are at the contraction tile, all entities move along the movement path to the expansion tile. At the expansion tile, each entity of the underlying object moves to the tile in the list of tiles making up the new position with the same index as the tile it used to occupy at the original position.

It should be appreciated that this is only one example in which the movement of the object may be controlled. Different methods of controlling movement may be used in different embodiments.

In other embodiments, the underlying object may simply be rearranged to fit into an area.

Figure 6:
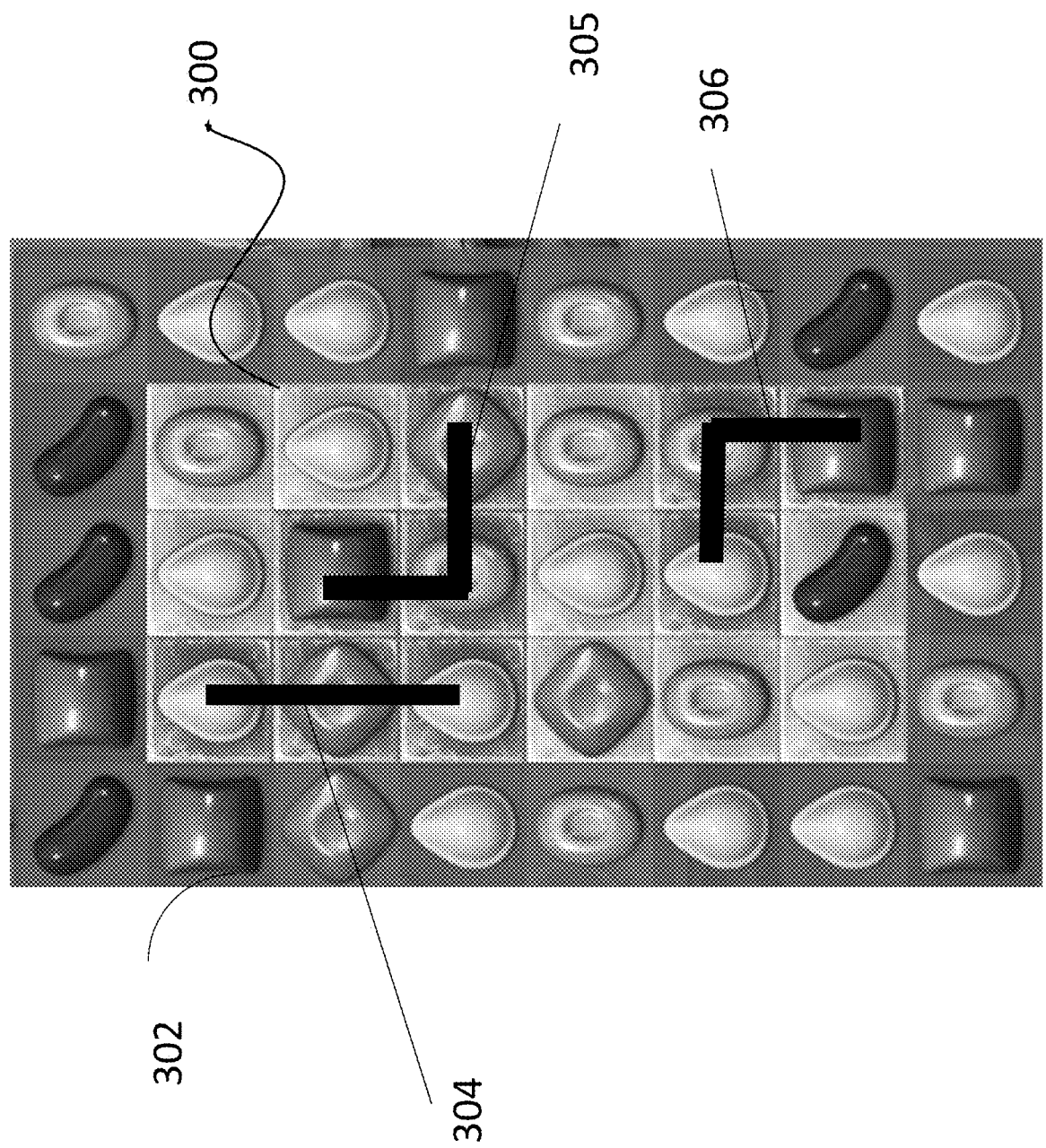
FIGS. 6 to 9 schematically show a game board at different times during a first game mode.

Reference is made to FIG. 6 which shows an example of an image displayed on a device. The image has a game board at the beginning of a game. The game elements 302 surrounding a central region have no cover object and no underlying object. The central region 300 has game elements, each of which is on a tile which has a cover object. As can be seen the game elements which overly a cover object can be distinguished from those which do not in that the visual appearance of the background to the game elements are different, depending on whether the cover object is present or not. Further in the central region, some of the game elements overly an underlying object. In the example shown, those underlying objects are highlighted by the shapes 304, 305 and 306. In some embodiments, this shape is not displayed but instead the appearance of a tile which has a cover object and which has an underlying object will be different to that of a tile which has a cover object and no underlying entity. In this embodiments, each underlying object is occupies three tiles. However, this is by way of example only. In some embodiments, different underlying objects may occupy different numbers of tiles to each other. In some embodiments, the underlying objects may alternatively or additionally be larger than three tiles and/or smaller than three tiles. At least one underlying object and preferably all underlying objects occupy at least two tiles.

Figure 7:
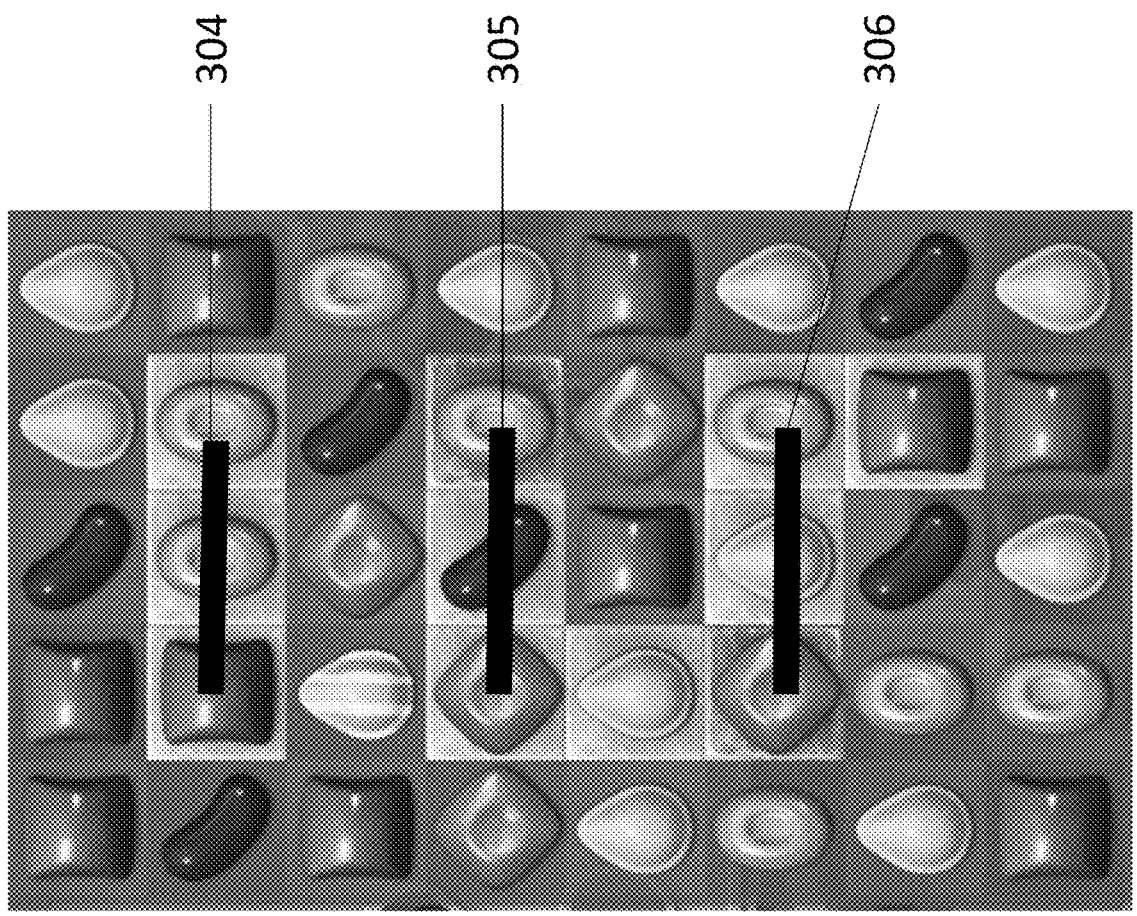

Reference is made to FIG. 7 which shows the game board shown in FIG. 6 but after some moves have been made. As can be seen a number of the cover objects have been removed and the underlying objects are still under cover objects but are in different positions. The underlying objects have moved so parts of the underlying objects that would have been exposed are again covered.

Figure 8:
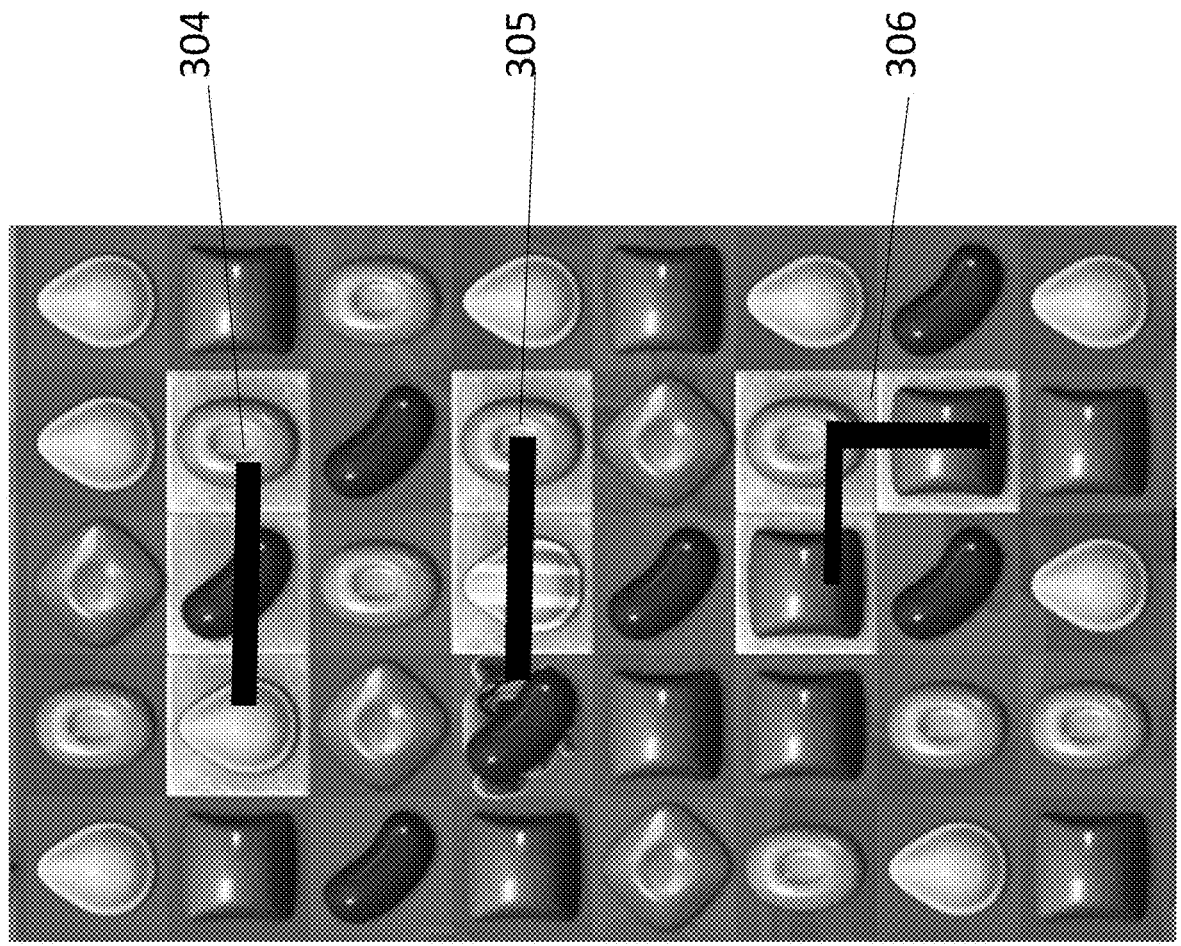

Reference is made to FIG. 8 which shows the game board shown in FIG. 7 but after some further moves have been made. As can be seen, the underlying object 305 is partially but not completely exposed and the cover area is too small to accommodate all of the underlying object.

Figure 9:
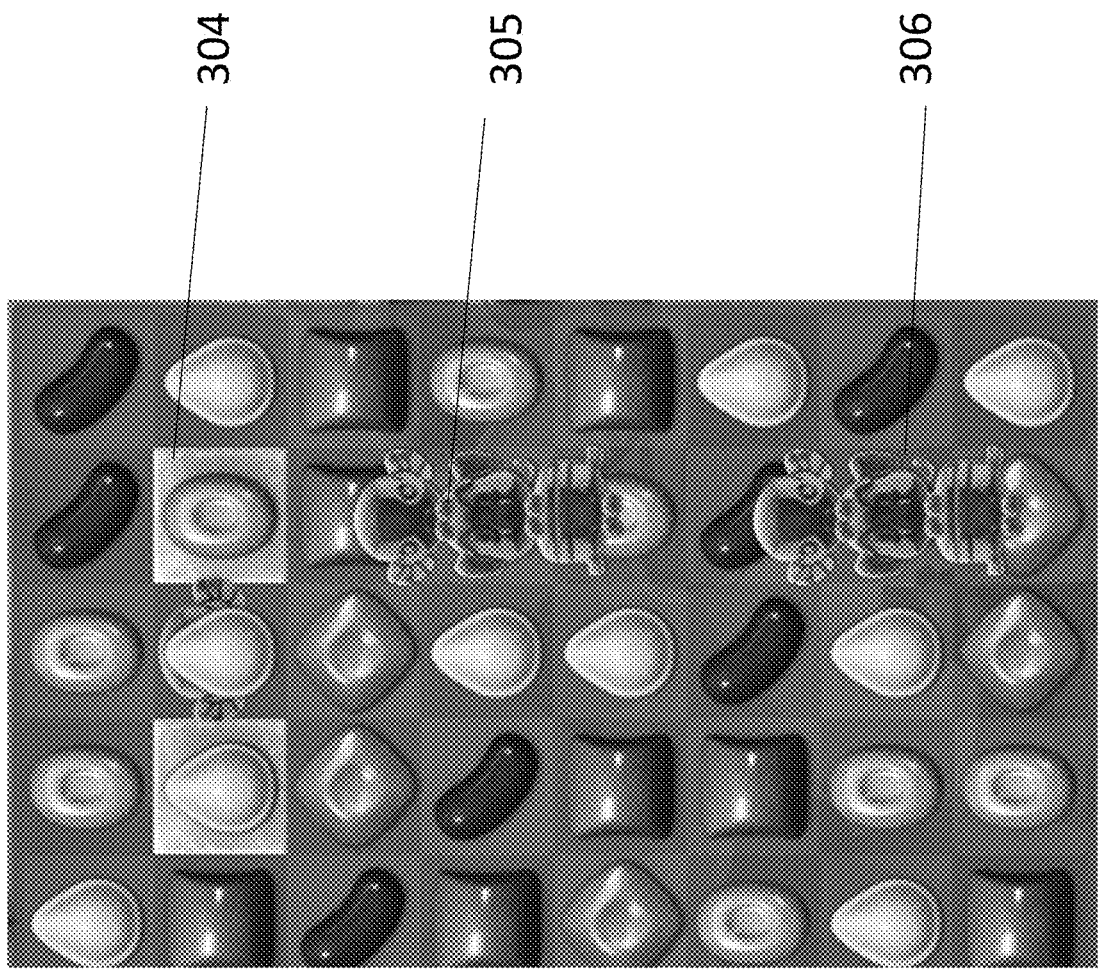

Reference is made to FIG. 9 which shows the game board shown in FIG. 8 but after some further moves have been made. As can be seen, two of the underlying objects 305 and 306 are exposed completely are in the process of being removed from the game board and one of the underlying objects 304 is now partially but not completely exposed.

In another embodiment, a game objective may be to "beat" another player or AI (artificial intelligence) controlling the cover objects. The other person or AI may have the objective to prevent the release of the underlying entities. For example the other person or AI when they make a match cover objects will be added, if not already present to the positions of the game elements which make a match. It should be appreciated the underlying objects may behave in the same way as described previously.

Accordingly in some embodiments, the game mode is modified so that after each turn of the user, the AI takes a turn. Any tile hit (i.e. underlying a game element which is part of match) as a result of a move made by the AI will be covered in a cover tile. The AI attempts to cover any exposed entity of an underlying object with cover tiles to make it harder for the player to capture the underlying objects by uncovering completely the underlying object.

Figure 17:
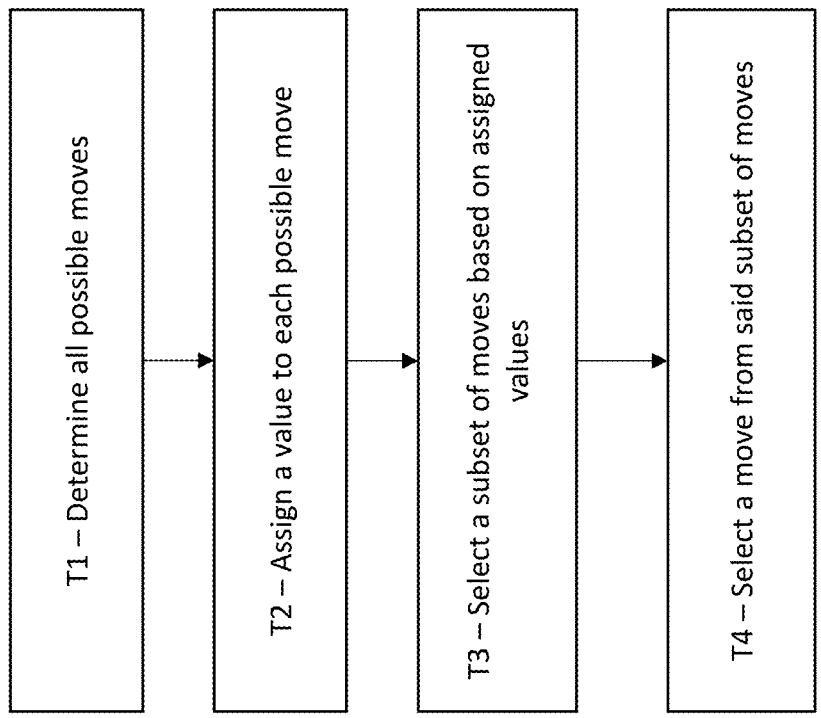
FIG. 17 shows a method used in another embodiment.

The moves made by the user will be as described in relation to FIGS. 3 and 4. Reference is made to FIG. 17 which schematically shows the method performed by the AI. The AI is implemented by one or more processors in the user device and/or in the host server.

In step T1, all possible moves are determined. For example, all possible swaps on the game board which result in a match may be determined.

In step T2, for each possible move, a value is assigned a value to it. Any suitable system for assigning value can be used. In one embodiment, the following scheme is used:

a. If the move would cover an entity of the underlying object with a cover object, add 1500 to its value.

b. If (a) is false and the move would cover a tile next to an entity of the underlying object with a cover object, add 200 to its value.

c. If (b) is false and the move would cover a tile (for example if the tile is currently uncovered), add 100 to its value.

d. If the move would create a special game element (e.g. a special candy or booster in the Candy Crush example), add 1 to its value.

e. If the move would trigger a special game element, add 4500 to its value if the current move is an extra move, otherwise 300.

It should be appreciated that the specific values and relative weighting order are by of example only and different values and relative weighting order may be used in other embodiments.

In step T3, a subset of moves may be selected. In some embodiments, n moves are selected. In other embodiments, any move above a threshold is selected. In other embodiments, no selection of a subset is made and the move or one of the moves with the highest score is selected. In one embodiment, all of the moves with a value greater than a third of the value of move with the highest value are selected to provide the subset of moves.

In step T4 one of the moves is selected from the subset. In one embodiment a move is selected from the subset at random.

Figure 10:
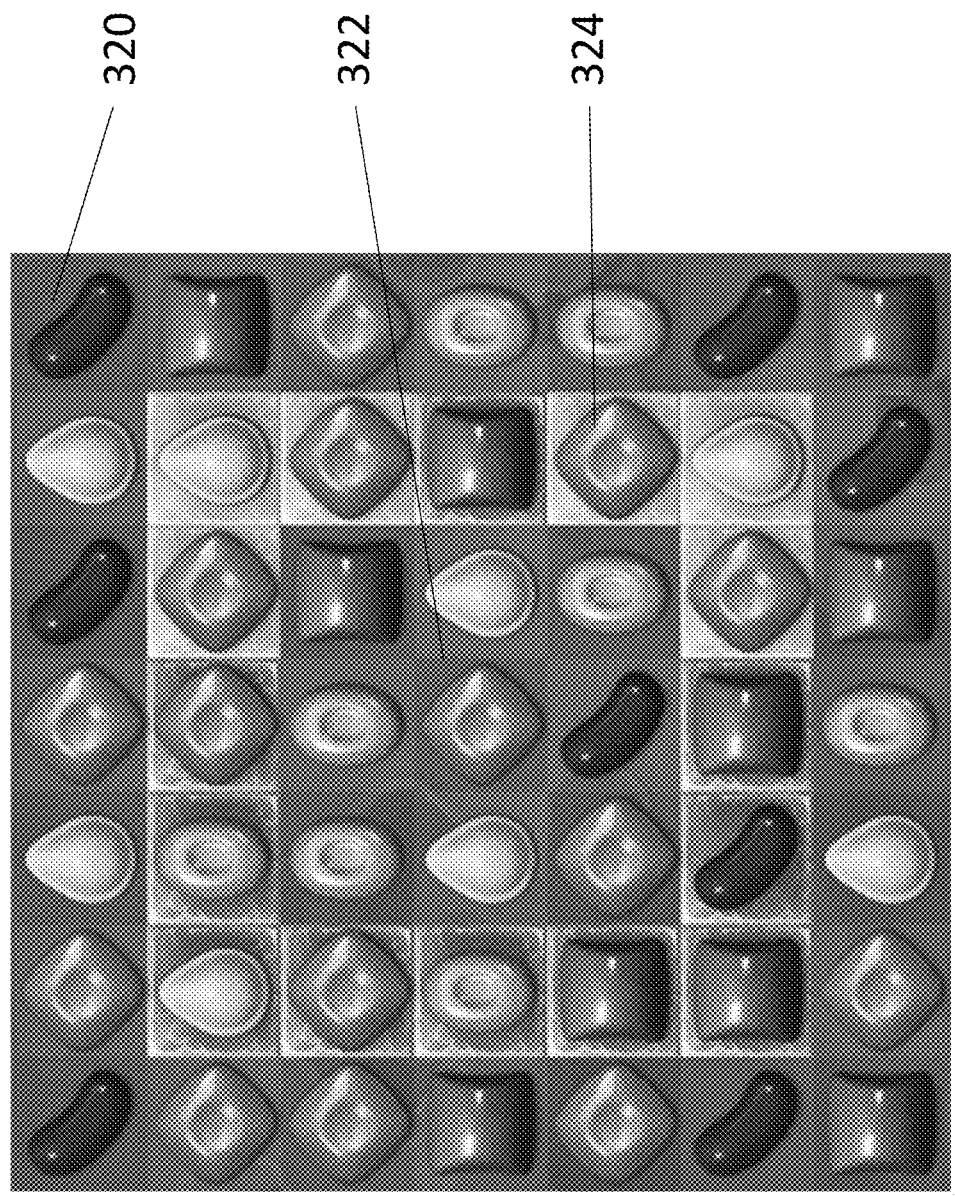
FIGS. 10 to 12 schematically show a game board at different times during a second game mode.

Reference is made to FIG. 10 which shows an initial game board for a game between a user and an AI. The game board has an inner square area 322 where no game element is on a covered tile, an outer border 320 where again no game element is on a covered tiles and an inner border 324 which separates the inner square area and the outer border area. The game element on the tiles forming the inner border are on covered tiles, some of which have an underlying object.

Figure 11:
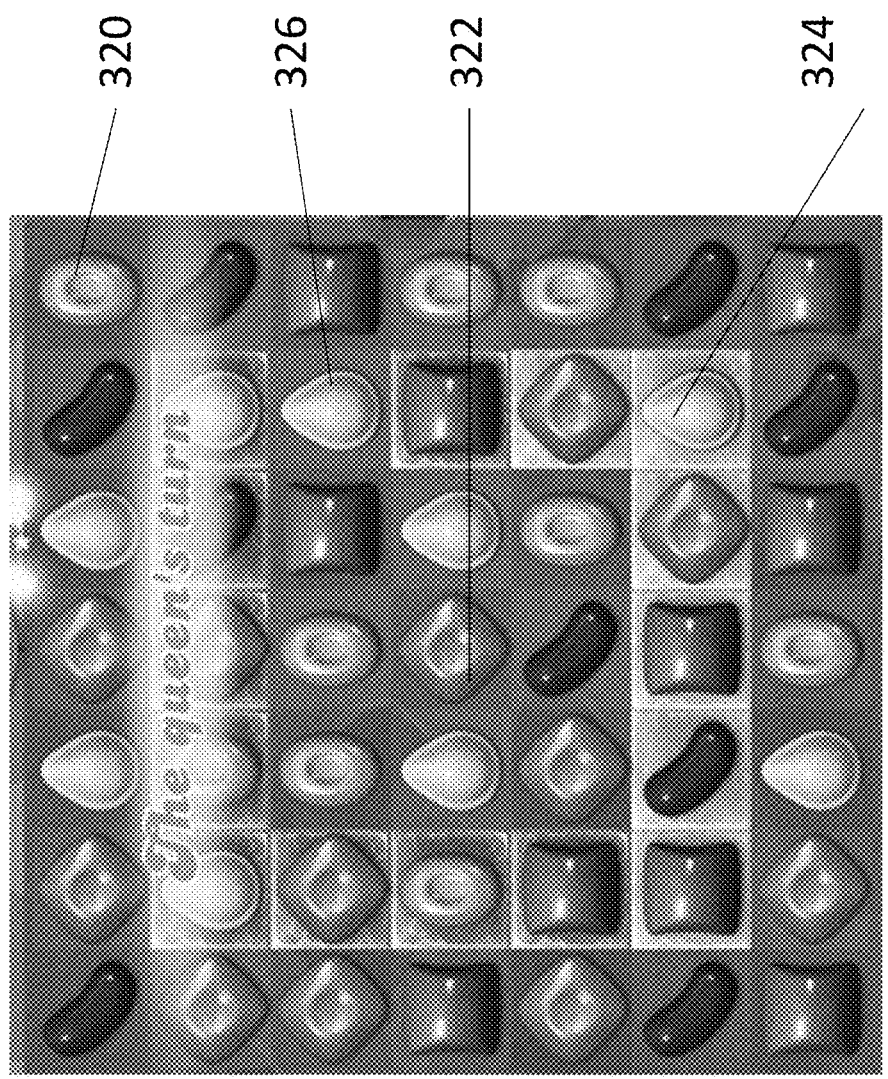

Reference is made to FIG. 11, which shows the game board after a user has made a move and the AI is to make a move. In the example shown, the AI is referred to as the "queen". As can be seen one of the tiles 326 in the inner border has been removed as a result of a move made by the user.

Figure 12:
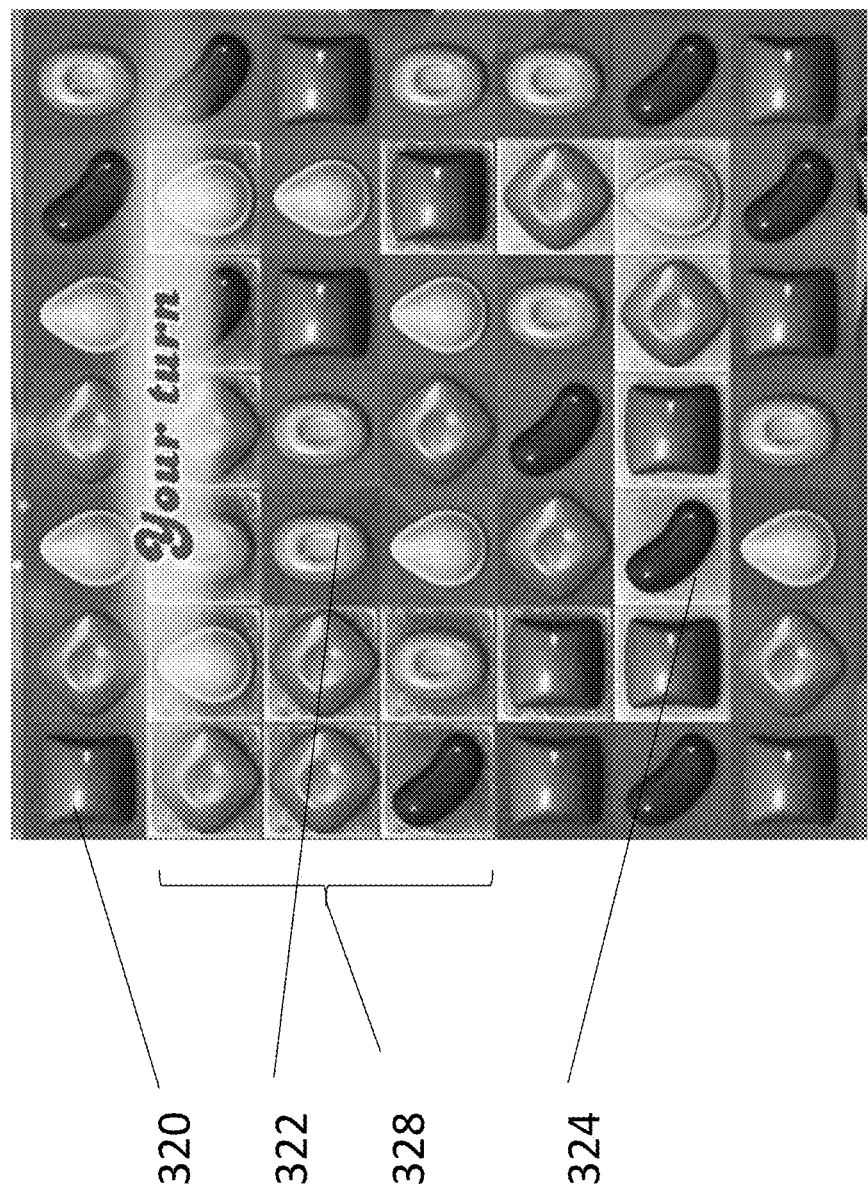

Reference is made to FIG. 12, which shows the game board after the AI has made a move and the user is to make a move. As can be seen, as a result of the move made by the AI, three tiles 328 in the outer border have now become covered tiles.

FIG. 13 illustrates a data structure for managing the tile background appearance, and schematically illustrates the interrelation between the data structure 1603 and a rendering engine 1600 of the graphics controller 180. The graphics controller is in the user device as described previously. The data structure 1603 can be held in any suitable storage circuitry, such as in the memory of the user device, as described previously. The rendering engine 1600 drives the display on a user interface 1602 which receives the video output from the graphics controller.

The data structure 1603 is responsible for controlling the game board displayed. Each tile has a tile ID 1605. The tile ID 1605 can define the position on the user interface where the tile is to be positioned. This allows the rendering engine 1600 to generate that tile at an appropriate position on the user interface display 1602. Each tile ID 1605 is associated with tile data 1607 which defines what game element it has associated with it, tile background data 1609 which defines if the tile is covered or uncovered and underlying entity data 1610 which defines if an entity of an underlying object is associated with that tile.

After a move has been made or there has been some change to the game board, the game engine will update this data such that updated tile image will be rendered by the rendering engine and displayed.

Figure 16:
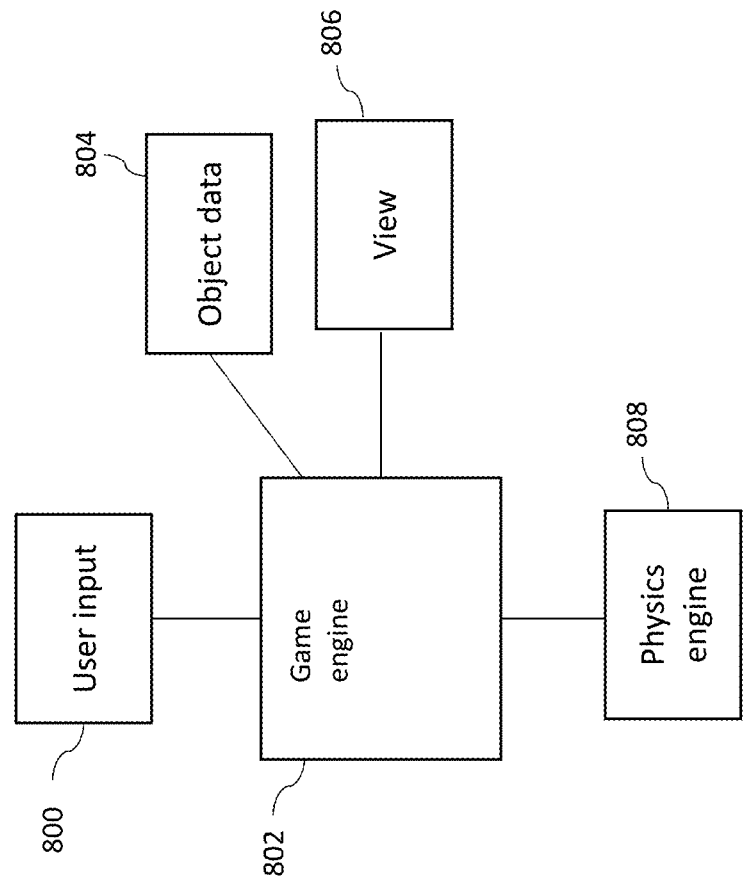
FIG. 16 is a schematic diagram showing the modules and functions associated with carrying out the operating of embodiments.

Reference is made to FIG. 16 which schematically shows the functional blocks of an embodiment, which may enable game play such as discussed previously. A user input block 800 is shown. This captures the user input and feeds the input to a game engine 802. In the context of the game of some embodiments, this user input may be which tiles are switched by a user. This user input can be via any suitable user interface, such as discussed earlier.

The game engine 802 will process the information provided by the user input. The game engine 802 (for example a game model) will determine if a valid combination has been made.

Each game element has object data associated therewith. The object data 804 may be stored in any suitable memory location. In some embodiments, the object data may be provided by the data structure described previously. In some embodiments, the object data may be considered to be part of the game engine and in other embodiments may be considered to be outside the game engine. The object data may provide information as to the properties of a game element. These properties can include attribute information such as colour and/or whether or not a game element has a particular function such as a so-called booster function. The object data may include the position data, that is, information representing the position of the game element in the displayed image.

In some embodiments, the game engine will check if the game element satisfies the rule or rules for a valid match. The rule or rules which define whether or not a match condition has been satisfied. The match condition will be dependent on the game. In some embodiments, a match condition will be satisfied if the game tiles are arranged to provide a sequence of at least three adjacent first objects sharing at least one same characteristic. In some embodiments, the game objects of the sequence are removed.

Thus, the game engine will be in control of the matching mechanism. The game engine will have access to data for each tile including its position and the at least one characteristic associated with the tile, and will be able to determine if a match condition has been met. If a match condition is met, the tiles in the match may be removed.

It should be appreciated that in other embodiments, the game may use any type of match mechanic such as switching, sliding or linking. The game elements may be any suitable game element and in some embodiments may be letters. In that scenario a match will occur when the letters match a word. Preferably the word is at least three letters long.

A physics engine 808 is provided which is configured to control the movement of moving game elements on the display.

The physics engine 808 may be part of the game engine 802.

A view function 806 uses of the object data to provide the displayed image with which the user is able to view and/or interact.

Figure 15:
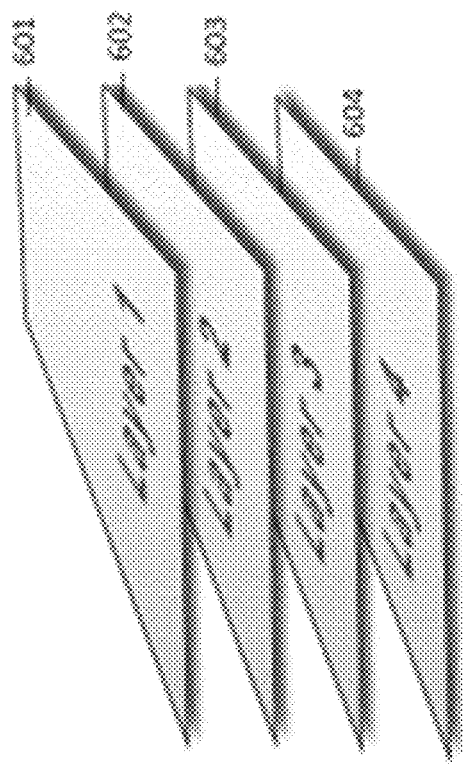
FIG. 15 is a conceptual diagram depicting the view layers of some embodiments.

FIG. 15 shows an example of a 4 layer display. FIG. 6 comprises a first or top layer 601, a second layer 602, a third layer 603 and a fourth or bottom layer 604. Visual objects in the top layer will be displayed on top of other visual objects in other layers. Visual objects in the second layer will be displayed below visual objects in the top layer, but above any further layers. Visual objects in the third layer will be displayed below visual objects in the top and second layer, but above any further layers. Visual objects in the bottom layer will be displayed below visual objects in all the other layers. It will also be appreciated that four layers is by way of example only and more or fewer layers may be implemented.

The bottom layer may be for the game board background, the third layer from the underlying object, the second layer for the cover objects and the top layer for the game elements.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device having:
   a user interface configured to display user actuatable game elements in a game board of tiles and to detect user input when a user engages with a game element in a move;
   at least one processor configured to receive a detected user input and on detecting a match game condition associated with the game elements to control the user interface to remove at least three game elements from the display and to generate replacement user game elements for a subsequent move; and
   a graphics rendering component operable to render the game elements on the user interface, each game element having a graphical representation on a tile,
   wherein said graphical rendering component is also operable to render at least one object on the user interface, said at least one object having a different graphical representation to each of said game elements, said at least one object being provided at a first location on said game board, said first location occupying a first plurality of tiles, each tile of said first plurality of tiles also having a respective game element,
   wherein said at least one processor is configured to control movement of said at least one object from said first location to a second location occupying a second plurality of tiles in dependence on a match game condition.

2. The computer device as claimed in claim 1, wherein said first plurality of tiles differs from said second plurality of tiles by one or more tiles.

3. The computer device as claimed in claim 1, wherein each tile further has one of a plurality of visually distinct different properties, wherein the processor is configured to determine on detecting the match game condition if at least one respective tile of the game elements in the match game condition has a first one of the plurality of properties and if so to change the property to a second one of the properties.

4. The computer device as claimed in claim 3, wherein the first plurality of tiles have a first one of the plurality of visually distinct properties.

5. The computer device as claimed in claim 3, wherein, said processor being configured after a match has occurred to determine for at least one object, the property of the each tile of the respective plurality of tiles with which that object is associated.

6. The computer device as claimed in claim 3, wherein when a respective object is associated with at least one tile having the first property as well as at least one tile of having the second property, the processor is configured to determine if that respective object can be positioned so that the respective object is only associated with a plurality of tiles having the first property and if so to reposition the respective object to be associated only with the plurality of tiles having the first property.

7. The computer device as claimed in claim 6, wherein the processor is configured to determine if the respective object can be positioned so that the respective object is only associated with a plurality of tiles having the first property by determining a plurality of candidate areas, each candidate area comprising a plurality of tiles having the first property.

8. The computer device as claimed in 7, wherein for at least one candidate area, the processor is configured to determine if one or more entities of another object are present in the candidate area and if so to adjust the candidate area.

9. The computer device as claimed in claim 7, wherein said processor is configured to remove any candidate area from the plurality of candidate areas which is smaller than the respective object.

10. The computer device as claimed in claim 6, wherein the processor is configured to determine a path of movement for respective object from its current position to the reposition.

11. The computer device of claim 6, wherein the graphics rendering component is operable to render a representation of the repositioned respective object.

12. The computer device as claimed in claim 3, wherein the first property comprises the presence of a first property object and the second property comprises the absence of the first property object.

13. The computer device as claimed in claim 12, wherein the first property object comprises a cover object and the second property comprises the absence of the cover object.

14. The computer device as claimed in 9, wherein the at least one object is configured to underlie at least one of the cover objects.

15. The computer device as claimed in claim 12, wherein the graphics rendering component is configured to cause the game element to be overlaid over the first property object which is overlaid over the object.

16. The computer device as claimed in claim 3, wherein the processor is configured to determine if at least one object is only associated with tiles having the second property and if so to remove that object.

17. A computer program product for controlling the display of a tile image on a display of a computer device, the computer program product comprising code embodied on a computer-readable medium and being configured so as when executed on a processor of the computer to:
   cause user actuatable game elements in a game board to be displayed;
   detect user input when a user engages with a game element in a move;
   on detecting a match game condition associated with the game elements, cause at least three game elements from the displayed game board to be removed and generate replacement user game elements for a subsequent move;
   render the game elements on the user interface, each game element having a graphical representation on a tile,
   provide at least one object on the user interface, said at least one object having a different graphical representation to each of said game elements, said at least one object being provided at a first location on said game board, said first location occupying a first plurality of tiles, each tile of said first plurality of tiles also having a respective game element; and control movement of said at least one object from said first location to a second location occupying a second plurality of tiles in dependence on a match game condition.

18. A computer implemented method of controlling a user interface responsive to user engagement with displayed game elements on an interface, the method comprising the following steps implemented by a processor of a computer device:

causing user actuatable game elements in a game board to be displayed;

detecting user input when a user engages with a game element in a move;

on detecting a match game condition associated with the game elements, causing at least three game elements from the displayed game board to be removed and generate replacement user game elements for a subsequent move;

rendering the game elements on the user interface, each game element having a graphical representation on a tile;

providing at least one object on the user interface, said at least one object having a different graphical representation to each of said game elements, said at least one object being provided at a first location on said game board, said first location occupying a first plurality of tiles, each tile of said first plurality of tiles also having a respective game element; and controlling movement of said at least one object from said first location to a second location occupying a second plurality of tiles in dependence on a match game condition.

* * * * *